Oct. 21, 1958   A. EILERSGAARD   2,856,736
DRILL GRINDER
Filed March 1, 1957   5 Sheets-Sheet 1
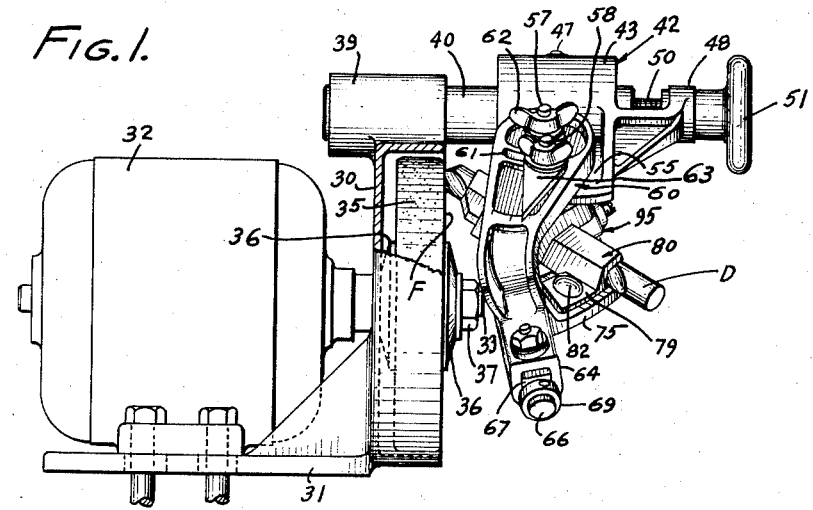
Fig. 1.
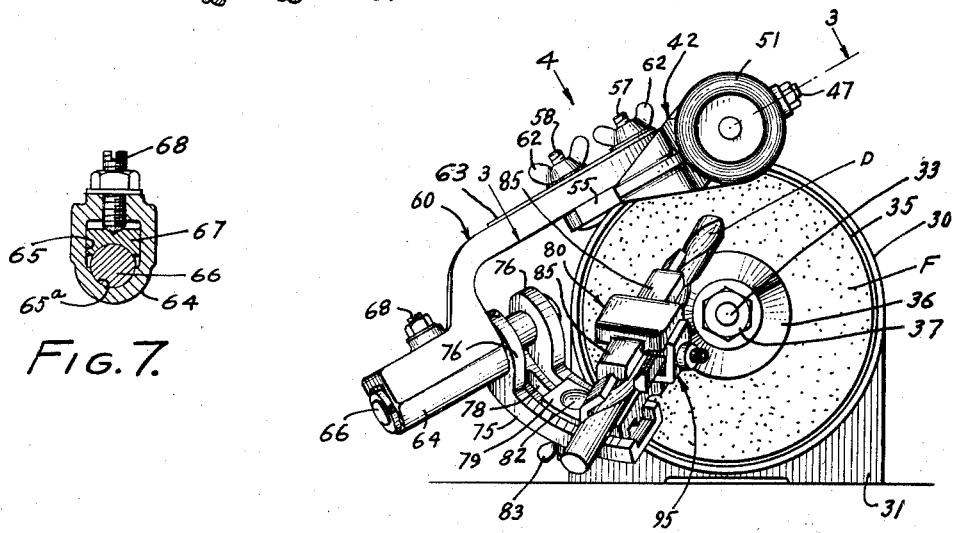
Fig. 2.
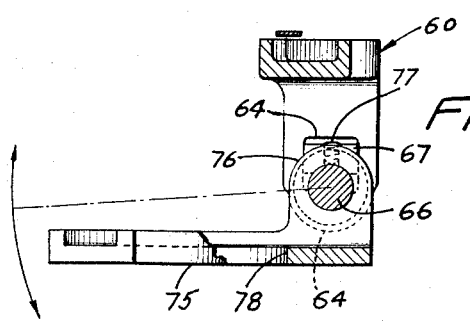
Fig. 7.
Fig. 6.
INVENTOR:
ASGER EILERSGAARD
BY Oct. 21, 1958  A. EILERSGAARD  2,856,736
DRILL GRINDER
Filed March 1, 1957  5 Sheets-Sheet 2

INVENTOR.
ASGER EILERSGAARD
BY

Oct. 21, 1958  A. EILERSGAARD  2,856,736
DRILL GRINDER
Filed March 1, 1957  5 Sheets-Sheet 3
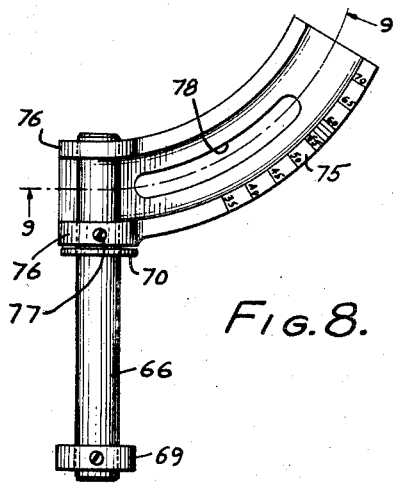
Fig.8.
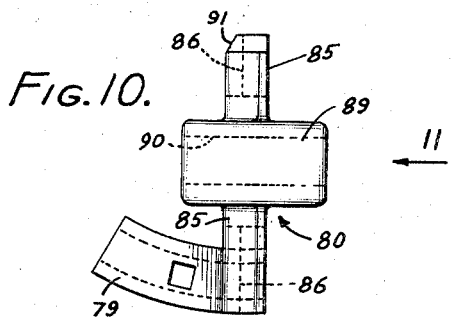
Fig.10.
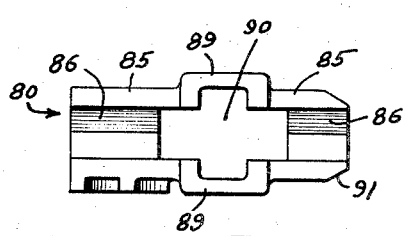
Fig.11.
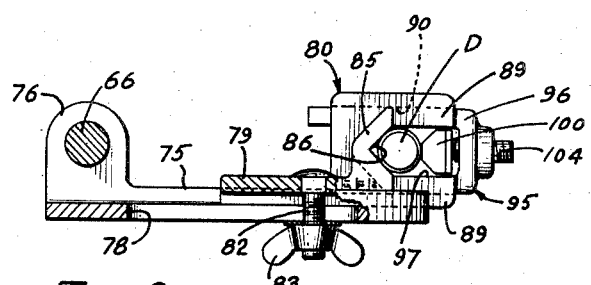
Fig.9.
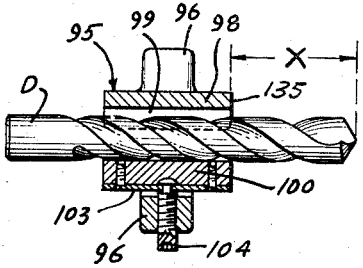
Fig.14.
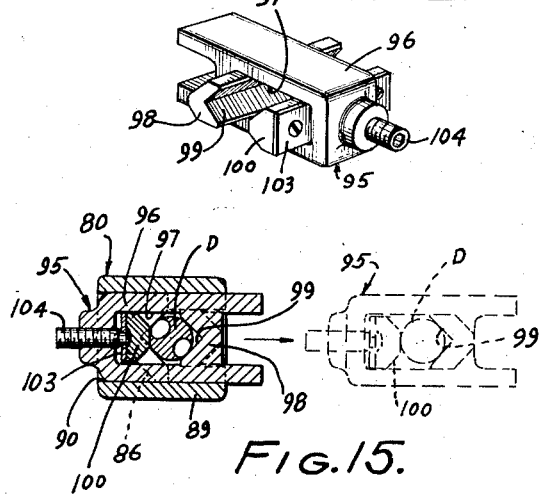
Fig.12.
Fig.15.
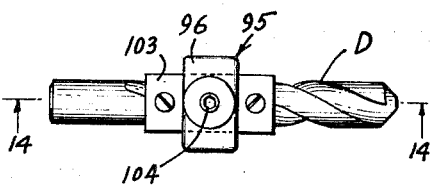
Fig.13.
INVENTOR:
ASGER EILERSGAARD
BY

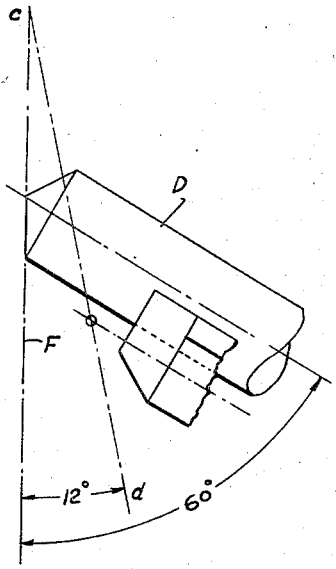
Fig.16.
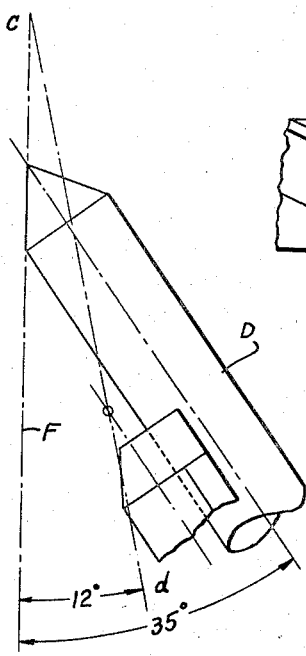
Fig.18.
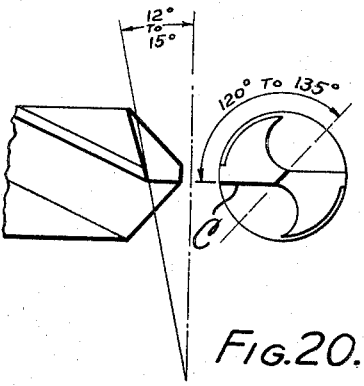
Fig.20.
Fig.21.
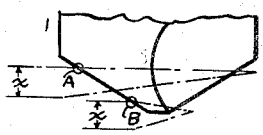
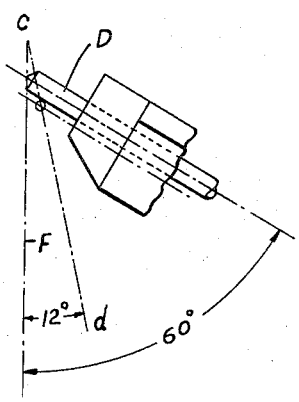
Fig.17.
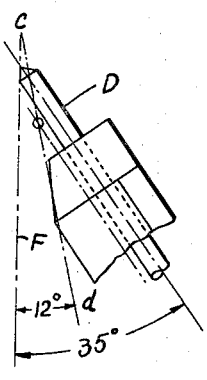
Fig.19.
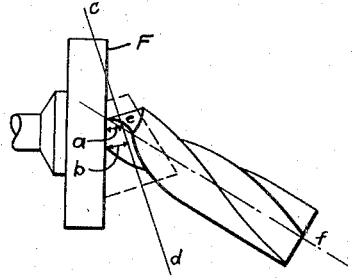
Fig.22.
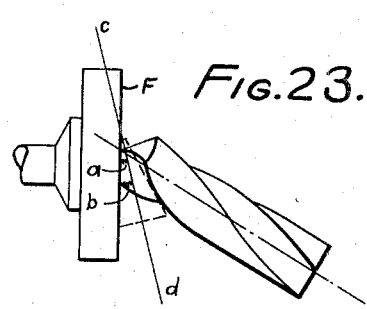
Fig.23.
INVENTOR:
ASGER EILERSGAARD Oct. 21, 1958 — A. EILERSGAARD — 2,856,736
DRILL GRINDER
Filed March 1, 1957 — 5 Sheets-Sheet 5

INVENTOR:
ASGER EILERSGAARD
BY

United States Patent Office 2,856,736
Patented Oct. 21, 1958

2,856,736

DRILL GRINDER

Asger Eilersgaard, Los Angeles, Calif.

Application March 1, 1957, Serial No. 643,468

11 Claims. (Cl. 51—124)

This invention relates generally to grinding machines and work holders therefor, and is concerned more particularly with a grinder for grinding drills.

One object of the invention is to provide a practical and efficient grinding machine having a device for supporting a drill in position to cause its cutting edges to be ground by the abrasive wheel of the machine.

Another object of the present invention is to provide a drill support or holder which is so constructed and arranged relative to the grinding wheel that it is operative to turn the drill on an axis angularly related to the planar surface of the grinding wheel so that the proper clearance angle, rearwardly of the cutting edge of the drill, may be obtained.

Another object of the invention is to provide a drill support or holder adapted for incorporation in the grinding machine, or as an attachment therefor, said holder including a carrier adjustable toward and away from the face of the grinding wheel to effect engagement of the top of the drill thereagainst, and also adjustable arcuately in a plane parallel with the grinding face of the wheel so that the drill may be adjusted toward and away from the axis of the grinding wheel to evenly distribute wear of the wheel.

Another object of the invention is to provide a drill-grinding means which also includes a support member pivotally connected to the carrier for adjustment in a plane substantially tangentially of the grinding wheel and normal to the grinding face of the abrasive wheel, said support member having a bearing arranged on an axis extending angularly with respect to the axis of the grinding wheel in both horizontal and vertical directions. The improved drill grinder also includes a protractor quadrant member which has a pivot pin rotatable in said bearing to adapt the quadrant member for pivotal movement in a plane extending normal to the axis of the pivot pin and bearing, the protractor quadrant being arranged on an arc generated from a point substantially coinciding with the intersection of the axis of the pivot pin and the working face of the grinding wheel. Mounted for adjustment along the quadrant, toward and away from the axis of the pivot pin, is a drill-rest member having a V-shaped rest for receiving the drill to be ground and for supporting the drill in a position wherein the axis of the drill approximately coincides with the intersection of the axis of the pivot pin and the working face of the grinding wheel. In accordance with this invention, the drill rest member is shaped to receive a drill holder in which the drill is clamped, said holder being insertable in and adapted to be keyed to the rest member in either of two opposite positions. By this provision, the drill may be initially set rotatively in the holder to effect grinding of one of its two cutting edges and thereafter the holder may be reversed by rotating it through 180 degrees to position its other cutting edge for grinding. In view of the construction as outlined generally above, the drill to be ground may be adjusted along the protractor quadrant in accordance with the included angle of its cutting edges, and the support member may be adjusted on the carrier to adjust the pivot pin angularly from a position in which the axis of the pin is substantially coextensive with the plane of the grinding face. Also the drill may be adjusted axially in the holder to project its tip end at a distance which will cause the axis of the drill to intersect the axis of the pivot pin at a predetermined distance from the grinding face of the wheel. The end result of such adjustments is to so locate the tip of the drill relative to the intersection of the axis of the drill and pivot pin, and to adjust the included angle between these axes, that when the drill is rotated on the axis of the pivot pin it generates a geometrical cone, the conicity of which determines the angle of clearance ground by the wheel rearwardly from the cutting edge of the drill.

Another object of the invention is to provide a new and improved drill grinding attachment which can readily be attached to commercial types of grinders and which will enable an unskilled person to sharpen drills quickly and accurately according to the most scientific and approved form for most efficient drilling of various materials.

Another very important object of this invention is to provide a drill grinding attachment which is very low in manufacturing cost and which will, at the same time, be a precision instrument with means for maintaining its precision by simple take-up adjustments.

Another object of this invention is to provide a drill grinding attachment which will readily sharpen drills with various kinds of shanks, such as straight round, taper round, or square, and which will handle any length of drill without adjustment of the attachment.

Another object of this invention is to provide an attachment which can move the drill toward or from the grinding wheel without rotating the drill on its axis, or moving it lengthwise in the V holder.

Another very important feature of this invention is, that by merely positioning the drill point a given distance from the drill clamp, this drill grinding attachment will sharpen the drill lips to true geometrical forms. The operation of positioning the drill in the clamp is convenient, as it can be done when free of the attachment.

A further object of this invention is to provide a very simple and quick adjustment to attain any desired drill lip clearance from zero to 20° with a gradually increasing drill clearance toward the point which, in drilling, travels in a smaller circle than the portion of lip nearer the outer circumstance of the drill.

Another object of this invention is to provide simple and quick adjustment for obtaining the desired lip angle for most efficient drilling of various materials and to make possible the grinding of drills to the smaller included angles of from 60° to 90° required for soft materials.

A still further object of this invention is to provide a holding means for the drill which is positive in action and which is especially desirable for smaller sizes of drills, the present grinder being an important improvement over present available drill grinding attachments which rely on the flute of the drill facing squarely against a thin controlling lip or pointed and require that the opposite flutes face squarely on this lip when the drill is positioned for grinding the other lip to insure that the two lips are ground alike and 180° apart. It can readily be seen that this is a very uncertain process with most present drills on the market.

It will be noted that my invention obtains by simple and quick adjustments all the above desirable and absolutely necessary functions required in a drill grinding attachment which will sharpen a drill to the most efficient form for any kind of material in an extremely simple, inexpensive, and novel construction.

The objects and features of my invention will be fully understood from the following detailed description of a typical preferred form and application of my invention, throughout which description reference is made to the accompanying drawings, in which:

Fig. 1 is a side elevational view of the present improved drill grinder applied, as an attachment or jig, to a conventional grinding machine;

Fig. 2 is a front elevational view of the same;

Figures 4, 5:
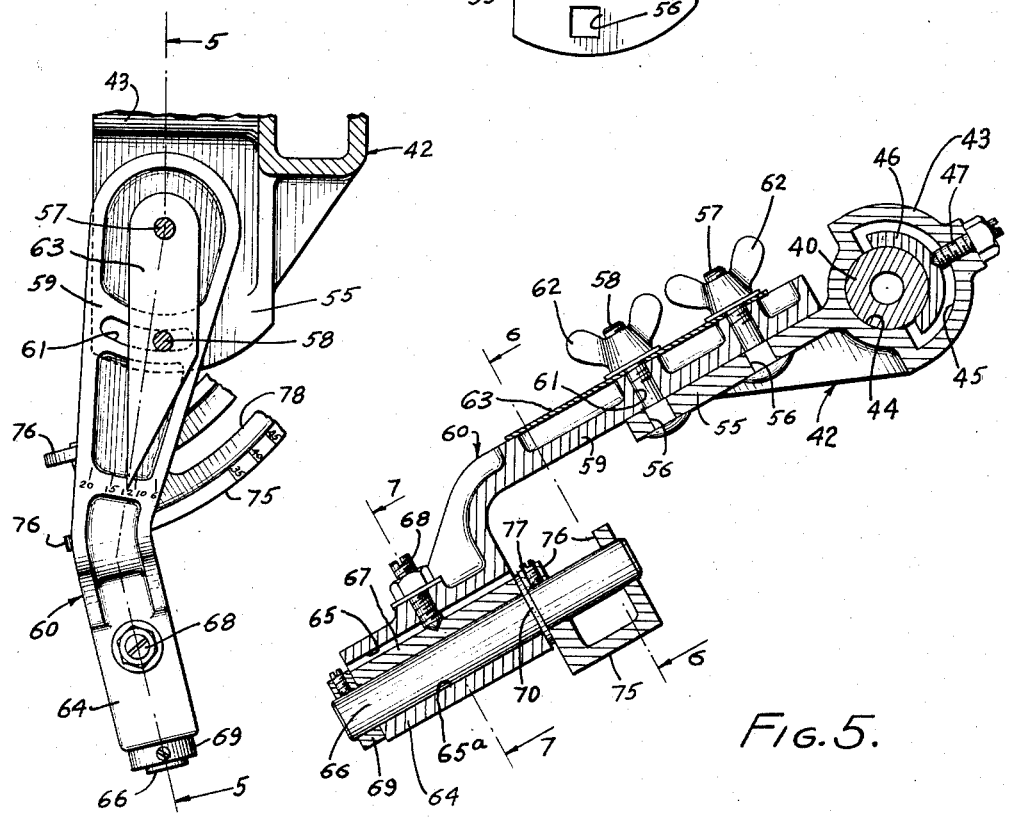
Fig. 4 is a side view of the carrier, as viewed in the direction of arrow 4 in Fig. 2.
Fig. 5 is a longitudinal sectional view through the carrier, taken on line 5—5 of Fig. 4.
Figure 24:
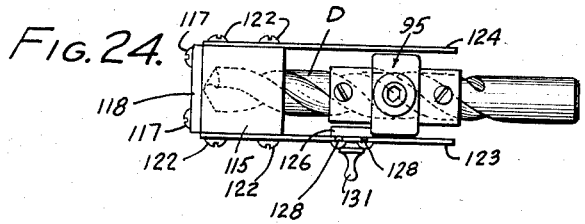
Figure 28:
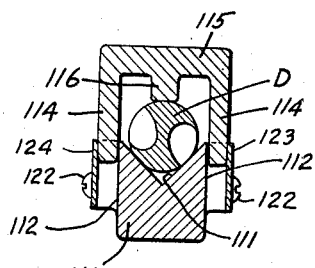
Figures 25, 26:
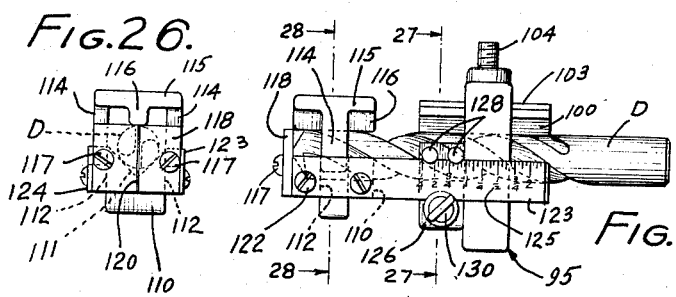
Figure 27:
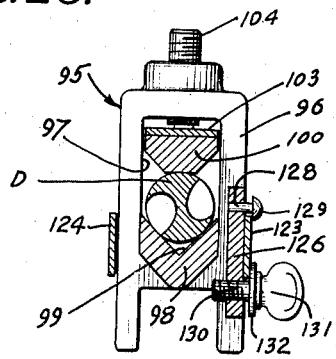
Figure 29:
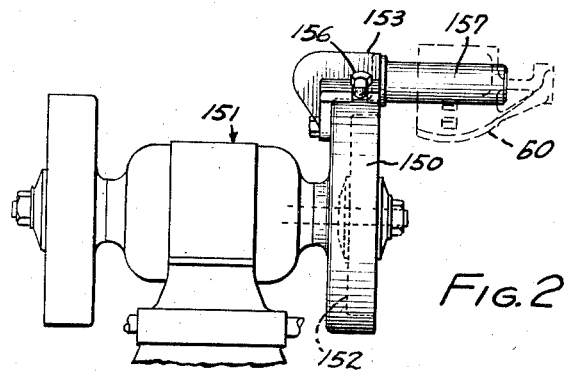
Figure 30:
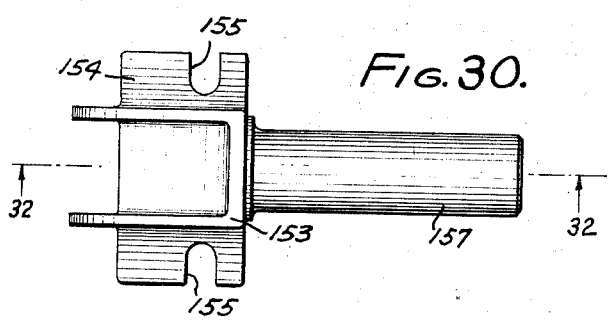
Figure 31:
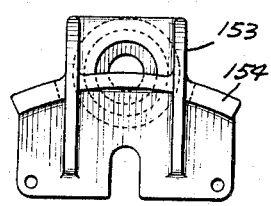
Figure 32:
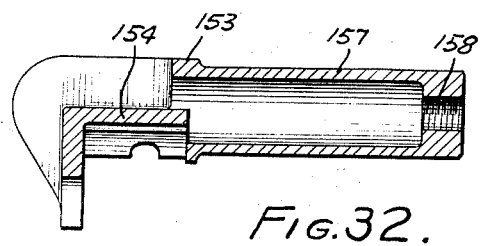

Figs. 6 and 7 are cross-sectional views, taken respectively on lines 6—6 and 7—7 of Fig. 5;

Fig. 8 is a front view of the protractor quadrant and its pivot, disassembled from the carrier or support;

Fig. 9 is a sectional view, taken on line 9—9 of Fig. 8, showing the drill holder and clamp in place;

Fig. 10 is a face view of the drill holder;

Fig. 11 is a side view of the same, as viewed in the direction of arrow 11 in Fig. 10;

Fig. 12 is a prospective view of the drill clamp;

Fig. 13 is a side view thereof, showing the drill in place to be ground;

Fig. 14 is a longitudinal sectional view, taken on line 14—14 of Fig. 13;

Fig. 15 is a view similar to the right-hand portion of Fig. 9, showing the drill holder and clamp reversed 180 degrees, these parts being shown in section;

Figs. 16 to 23 are more or less diagrammatical views included for the purpose of illustrating the principle of operation of the improved grinder;

Fig. 24 is a plan view of gauge device used in conjunction with the present drill grinder, said gauge being employed for adjusting the drill axially and rotatively, in the drill clamp;

Fig. 25 is a side view of the same;

Fig. 26 is an end view thereof;

Figs. 27 and 28 are enlarged, cross-sectional views, taken on lines 27—27 and 28—28 of Fig. 25;

Fig. 29 is a side view of a grinding machine, illustrating how the drill grinding mechanism is attachable thereto;

Figs. 30 and 31 are respectively plan and end views of the mounting means shown in Fig. 29; and Fig. 32 is a longitudinal section, taken on line 32—32 of Fig. 30.

In order to better understand the principle upon which the present invention is based, a brief discussion of the problems involved in sharpening drills will first be given, reference being had to Figs. 16 to 23 of the drawings.

Undoubtedly a skilled mechanic can produce a satisfactory drill point by exercising great care and taking plenty of time, for it is not an impossible task. However, all drill operators are not skilled mechanics and in this advanced age of mechanical knowledge no modern, up-to-date shop will rely on a skilled mechanic for this precise operation, nor will it tolerate the use of hand methods when there is an inexpensive machine which will do more accurate and faster work.

The shop owner not only demands that all his drills be sharpened on a drill grinder but insists that the grinder be one which is not only mechanically correct but on which is also designed and constructed on proven correct principles. The present drill grinder meets these qualifications. The fallacy of any workman attempting to sharpen a drill by hand can readily be seen when we consider what constitutes a perfectly sharpened drill.

For ordinary drilling, the angle the lips make with the axis of the drill should ordinarily be 59°, this being the standard adopted by drill manufacturers and proven by years of experience to be the best for all around work.

Both lips should have the same inclination to the axis of the drill. Where the angles are different we will have the condition where one lip is doing most of the work while the other is removing only a small portion of the metal, resulting in a hole larger than the drill.

Both lips should have exactly the same length, otherwise a drill sharpened in this manner will make an oversize hole and in addition cause a severe strain in the drill and drill-press.

Where the lips are of unequal lengths and have different angles, we have the worst possible condition. Here we actually have three sizes of holes: first, that made by the wobble of the center of the drill, the second by the short lip and the third by the long lip. This results in very severe punishment for both drill and drill-press.

The angle of lip clearance, Fig. 20, should be from 12° to 15°. This angle of lip clearance should gradually increase as we approach the center, so that the line across the web at the center of the drill connecting the two lips should make an angle of 120° with each lip with the 12° clearance angle and should increase to 135° when each lip with a 15° clearance angle is ground, Fig. 20.

Every mechanic is fully aware of the importance of clearance in any cutting tool, for if there is no clearance the tool will ride along the surface and will not enter the work. Therefore, if the tool is to penetrate and its edge is to cut, the surface back of the edge must be ground away at an angle, giving what we call clearance. The clearance of the cutting edge of a drill or the proper contour of the surface back of the cutting edge is of vital importance, for the effectiveness of the drill and its very life will depend largely on the form this clearance takes.

The clearance of the drill should gradually increase as we approach the center. The reason for this will be readily seen from Fig. 21. Let X equal the feed per revolution, and, as this is constant, the path described by A and B will correspond to the helical lines shown. As the vertical distance X, that each point moves per revolution of the drill, will be the same, the angle of the smaller helix will be greater than the larger one. The angle of the helix in each case indicates the minimum clearance necessary at the particular point for a feed equivalent to the distance X.

Accordingly, we can say that the clearance at any given point in the cutting lip is determined by, and bears a constant relation to, the tangent, at that particular point, of its own individual helix.

Therefore, near the point of the drill where the helices are of smaller diameter (their pitch remaining the same), these tangents form more acute angles with the axis of the drill than where the diameters are large, as near the outer corner of the lip. The clearance being governed by these angles must likewise be steeper near the point of the drill than it is farther out on the lip.

In order to grade the clearance properly along the drill lip from point to periphery as above outlined, and curve the back side of the cutting edge so that the maximum endurance and strength, consistent with free cutting, are preserved at all points, it is necessary that every portion of the cutting lip should, while being ground, rock against the grinding wheel in a path very similar to that in which it travels when at work.

If, while at work, those portions of the drill lip near the point travel in shorter paths and smaller circles than portions nearer the outer corner of the lip, then this condition should exist when the drill is being ground.

Let $c$ and $d$ in each Figs. 22 and 23 represent the axis about which the drill is rocked while being ground. Let $a$ and $b$ represent the radii of the arcs through which the different portions of the drill lip swing in front of the grinding wheel, $a$ being near the point and $b$ near the outer corner of the drill. It is evident from the above that where *a* is shorter than *b* the conditions are correct.

In order that we may attain this condition in actual grinding, that is, make *a* shorter than *b*, it will be necessary that the point, as it travels past the wheel, be in a segment of a cone whose axis is the line *c—d* and which makes the angle *d—e—f* with the axis of the drill (Fig. 22). The dotted line in Fig. 22 shows the complete frustrum of the cone.

The position where the axis of the cone cuts the axis of the drill is also very important. If this is too close to the center of the point of the drill as in Fig. 23 it will result in too great a center angle, that is, the angle which the line across the center web makes with the cutting lips, while if it is too far back, the opposite will result and the angle at the center will be too blunt, resulting, in both cases, in the consumption of considerably more power in the drilling operation. The intersection of the cone axis with the axis of the drill should be in such a position that with a 12° angle of clearance we obtain a center angle of 120° and this will increase to 135° when the angle of lip clearance is increased to 15°.

When drills are sharpened on machines where *a* and *b* are of the same length the drill point travels past the wheel in the segment of a cylinder and we have equal clearance along the entire length of the lip. Where *b* is shorter than *a*, the drill point travels past the wheel in the segment of an inverted cone and it is perfectly obvious from the above analysis, that the radius of curvature, in both these cases, is too small at the periphery compared with the radius of curvature at the center. The result will be that when the clearance at the center is correct there will be too small a clearance at the periphery and when the clearance at the periphery is correct there will be too much clearance at the center, resulting in a flattened center and the cutting edge near the center will have so little packing that the edge will chip with an increased liability of drill breakage.

The present drill grinder is designed and constructed in accordance with these geometric principles. It automatically locates the cone axis in relation to the drill axis for all sizes of drills within the machine capacity and also automatically takes care of the angle of lip clearance and provides the proper center angle.

Having outlined generally the principle upon which the invention is based, the drill grinding machine embodying means for carrying out the above procedure will next be described. Referring particularly to Figs. 1 and 2, the present improved drill holder mechanism or jog is shown as carried at the upper end of an upright circular guard portion 30 of a motor base 31. Supported upon the base 31 is an electric motor 32. The outer end of the armature shaft 33 provides a spindle to which an abrasive wheel 35 is connected by collars 36 and a nut 37.

Figure 3:
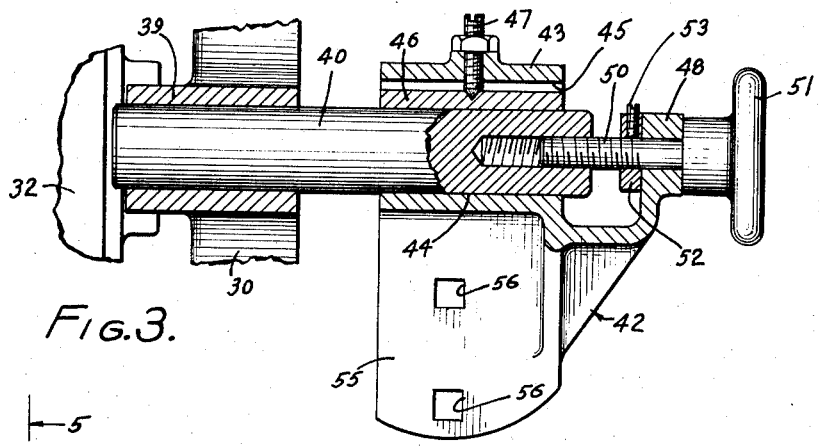
Fig. 3 is a sectional view, taken on line 3—3 of Fig. 2.

The guard 30 is provided with a horizontal boss 39 in which a shaft 40 is fixed, see also Fig. 3, the shaft projecting laterally from the boss and having an axial, threaded hole in its extremity. A carrier 42 has a boss 43 provided with a substantially semicircular bearing recess 44 (Fig. 5), receiving one half the periphery of the shaft 40. At the other side of the shaft, the recess is enlarged at 45 and located in this enlarged portion is a semicircular locking element or gib 46 which engages against the shaft. A set-screw 47 screwed into a hole in the boss 43 is engageable with the gib 46 to force the latter tightly against the shaft so as to lock the carrier in selected positions of adjustment axially of the shaft. The carrier 42 has a bearing boss 48 spaced axially from the boss 43. Rotatable in said boss 48 is an adjusting screw 50 having a threaded end screwed into the hole in the end of the shaft 40. The screw 50 has an integral operating knob 51 which abuts the outer end of the boss 48.

A collar 52, secured to the screw 50 by a set-screw 53, abuts the other end of the boss 48 to retain the screw against axial movement. It is thus seen that when the screw 50 is rotated, by means of the knob or handwheel 51, the carrier is adjusted axially of the fixed shaft 40, that is, toward and away from the flat working face F of the grinding wheel 35, depending upon the direction of rotation of the screw.

The carrier 42 has an integral downwardly sloping pad 55 provided with a pair of square apertures 56 (Figs. 3 and 5). Receiving in these apertures are the square portions of a pair of carriage bolts 57 and 58. The upper bolt 57 projects upwardly through a circular hole in the plate portion 59 of a support member 60. The other bolt 58 projects upwardly through an arcuate slot or opening 61 formed in the plate portion and arranged concentric with the axis of the bolt 57 (Figs. 1, 4 and 5). Wing nuts 62 screwed onto the upper ends of the bolts 57 and 58 and set up against the plate portion 59 serve to lock the support member 60 in selected positions of angular adjustment relative to the carrier 42 and also relative to the face F of the grinding wheel 35.

The support member 60 has a downwardly offset bearing boss 64 which extends parallel to the plate portion 59. The boss 64 has an axial bore 65, the lower portion of which forms a semicircular socket 66 in which a pivot pin or rod 66 is disposed (Figs. 5 and 7). A locking element 67 is slidable in the upper rectangular portion of the bore 65 and has a semicircular recess to adapt the element to embrace the upper side of the pivot pin 66. A set-screw 68 is threaded through a hole in the boss 64 and operative to force the locking element 67 into firm engagement with the pivot pin 66 so as to lock the same in different positions of rotative adjustment. A collar 69 fixed to the lower end of the pivot pin 66 holds the latter against upward axial movement, and a flange 70 on the pin takes the thrust in the opposite direction.

As shown in Figs. 1, 2, 5, 6 and 8, a protractor quadrant 75 is carried at the inner projecting end of the pivot pin 66. The quadrant is of channel shape throughout and at one end, its sides are extended upwardly in ears 76 which have aligned holes through which the pivot pin extends. A set-screw 77 screwed through a hole in one of the ears engages the pivot pin to secure the quadrant thereto. The quadrant extends in an arc which is generated from a point adjacent the face F of the grinding wheel 35. The quadrant has a central, curved, elongate slot 78.

Disposed on the quadrant 75 and adapted for arcuate adjustment therealong is the arcuate foot 79 of a drill holder 80, shown in detail in Figs. 9 to 11. The foot 79 has a square hole for receiving the square shank of a carriage bolt 82 which extends downwardly through the slot 78 to receive a wing nut 83 which may be tightened to clamp the holder 80 in selected positions of arcuate adjustment on the protractor quadrant 75. Extending radially inwardly from the foot 79 is an integral bar portion 85 which has a V-groove 86 therein providing a seat for the drill D to be sharpened. Intermediate its ends, the bar portion 85 is interrupted by an enlarged transverse socket portion which is formed by upper and lower channel-shaped guides 89. The metal at the longitudinal center of the bar portion 85 is cut away at the sides of the channels 89 to define, with the channels, a cross-shaped socket 90. The inner extermity of the bar portion 85 is chamfered as indicated at 91.

The drill D is adapted to be carried by a clamp element 95, which, as shown in detail in Figs. 12 to 15, has a rectangular body 96 provided with a slot 97. At one end of the slot the body 96 has an integral, bar-like clamp portion 98 which projects laterally beyond the sides of the body. The portion 98 has a V-groove 99 extending throughout its length and facing the other end of the slot 97.

Adapted to slide in the slot 97 toward and away from the stationary clamp portion 98 is a movable clamping member 100 which, as shown, is simply a bar of half-octagonal cross-sectional shape (Figs. 12 and 15). The member 100 carries a plate 103 to which the inner end of a clamping screw 104 is connected for rotation, the screw being threaded through a hole in the body 96.

With the drill D inserted into the body 96 and seated in the groove 99, the screw 104 is turned to force the clamping member 100 toward the clamp portion 98 so sa to clamp the drill in the groove. The clamp 96, 98, 100 and drill D thus are joined together as a unit for installation into the holder 80. It is to be noted at this point that the side and shape of the clamp element 95, when viewed from the screw end 104, are substantially the same as the cross-shaped socket 90 of the holder. Consequently, the clamp element 95 is insertable therein in a direction transversely of the bar 85, that is, through the open side of the holder 80. Inward placement of the clamp element into the holder is limited when the drill D, carried by the clamp element, comes to rest in the V-shaped groove 86. As will be more fully explained later, the clamp element 95, may be withdrawn from the holder 80, reversed and re-inserted into the holder, Figs. 9 and 15 illustrating the clamp element in its two positions.

In order to carry out the drill grinding procedure with precision, it is important that the tip of the drill D being sharpened project accurately a predetermined distance outwardly from the inner end of the bar 98 of the clamp element 95, as indicated by the dimension X in Fig. 14. To facilitate locating the drill D in accordance with the requirements, and avoid the procedure of loosening the screw 104, sliding the drill, measuring the distance X and re-tightening the screw, the present invention contemplates the provision of a gauge device for the purpose. Referring to Figs. 24 to 28, the gauge device includes a block 110 having a V-groove 111 in its upper surface for receiving the working end of the drill D.

The block 110 is provided with a vertical groove 112 in each of its side faces. Slidable in the groove 112 are the depending legs 114 of an inverted U-shaped gripper element 115 having an integral lug 116 on the lower surface of its upper portion. Secured against an end of the block 110 by screws 117 is a transparent plate 118, made from plastic material and having a central, vertical index line 120 scribed therein.

Secured to the sides of the block 110 by screws 122 are metal strips 123 and 124 which extend across the slots 112 as shown in Fig. 28. The strips 123 and 124 project at a considerable distance from the end of the block 110 opposite to the plate 118. The strip 123 is provided with a linear scale 125 on its outer face. Arranged to slide longitudinally along the scale or gauge strip 123 is a gauge plate 126. As shown in Figs. 25 and 27, the plate 126 carries a pair of guide pins 128 adjacent its upper edge, said pins projecting laterally from the plate and having heads 129 spaced from the outer face of the plate a distance substantially equal to the thickness of the gauge strip 123 to receive the upper edge of the strip between the heads and the plate. Screwed into a threaded hole in the gauge plate 126 adjacent the lower edge thereof is a binder screw 130 having a head 131 and carrying a sasher 132. As illustrated in Fig. 27, the pins 128 and screw 130 with their respective heads 129 and washer 132 serve to guide the stop plate 126 in its sliding movement on the gauge strip 123.

When setting up the machine for sharpening a drill, it is necessary to so arrange the drill in the holder 80 that the tip of the cutting end of the drill projects a predetermined distance beyond the point of intersection of the axes $c$, $d$ and $e$, $f$ as indicated by the dimensions "$a$" in Figs. 22 and 23, this dimension varying according to the type of drill to be ground and being calculated trigonometrically. Since it would obviously be extremely difficult to measure these distances "$a$", I have determined that accurate results can be obtained by setting the drills to project certain distances "X" from the rear end 135 of the clamp device 95 as indicated in Fig. 14. To facilitate this procedure, the correct distances "$a$" for the different types of drills is calculated and tabulated so that by consulting the table the appropriate value is readily ascertained. Referring now to Fig. 25, the linear scale 125 on the gauge strip 123 is marked off in values of "$a$" and these marks are so arranged relative to the end 118 of the gauge device 110 that the tip of the drill is automatically set at the appropriate distance X from the end 135 of the clamp device 95.

As an example, let it be assumed that the tip of the drill must be set at an "$a$" distance of $15/16''$. To effect such a setting of the drill, the latter is first placed in the clamp device 95 and very lightly clamped in place by manipulating the clamping screw 104. The slide 126 is next adjusted along the bar 123 to align its right-hand edge with the mark $15/16''$. The clamp 95 is then slid into place between the side strips 123 and 124 of the gauge 110, with the working end of the drill D seated in the V-groove 111 (Figs. 25 and 28). The hold-down element 115 is next placed over the block 110 with its legs 114 sliding downwardly in the vertical grooves 112 until its lug 116 engages the drill. By squeezing the parts 110, 115 together the drill D is held in place in the gauge. Prior to this operation, however, the tip of the drill is caused to bear against the transparent plate 118 and the drill is also rotated to arrange the two cutting edges of the two-lip drill parallel to the vertical index line 120 of the end plate 118. This is easily accomplished by sighting through the transparent plate or window 118.

With the working end of the drill D thus positioned and held in the gauge device, the clamp device 95 is slid axially of the drill until the vertical body 96 engages against the slide element 126 as shown in Fig. 26. The screw 104 is then tightened to cause the drill to be firmly clamped between the parts 98 and 100, after which pressure against the element 115 is relieved to allow withdrawal of the drill D and the clamp 95 from the gauge. The working end of the drill now projects at a distance X from the clamp device which, when the drill is mounted in the holder 80 for sharpening, will cause the drill to extend the necessary distance "$a$," in the present typical example $15/16''$.

With the drill thus accurately positioned in the clamp device 95, the latter is slid into the holder 80 to seat the end portions of the drill D in the V-grooves 86 at the ends of the holder.

Prior to mounting the drill clamp 95 in the holder 80 carried by the quadrant 75, various adjustments are effected. For example, the support member 60 is adjusted angularly toward or away from the grinding wheel 35 by pivoting it on the bolt 57, the nuts 62 being first loosened to allow such pivotal movement. As before explained, the fixed pointer 63 is adapted to register with graduations on the support member 60. By selecting the proper graduation, the support member 60, quadrant 75 and drill holder 80 will be set in accordance with the clearance angle to be ground at the point of the drill D carried by the holder. That is, the drill will be so positioned that any selected angle between the 12° to 15° indicated in Fig. 20 will be attained. After this adjustment of the support member 60 has been made, the nuts 62 are tightened to maintain the adjustment.

The device is next adjusted angularly in accordance with the angle of the cutting edge of the drill relative to the axis of the drill, for example between the 60° and 35° angles shown in Figs. 16 and 18. This adjustment is easily effected by simply loosening the wing nut 83 and sliding the holder 80 in the quadrant 75, toward or away from pivotal axis of the rod 66.

With the device adjusted angularly in two planes as explained above, and with the drill D in position in the holder 80, the drill grinder unit is moved toward the grinding wheel 35 to cause a lip of the drill to engage the grinding face of the wheel. This is quickly accomplished by simply rotating the knob 51 and screw 50 to cause the device to be slid bodily on the fixed shaft 40.

The device is then ready for a drill grinding operation. As rotation of the grinding wheel 35 is started, the drill point is first ground along its cutting edge or lip C (Fig. 20). To continue the grinding of one side of the drill tip, it is only necessary to hold the clamp 95 firmly in the holder 80 and pivot the drill D, holder 80 and quadrant 75 upwardly on the rod 66. During this upward pivotal movement of the quadrant, the top of the drill point remains almost stationary against the face F of the grinding wheel 35. However, due to the fact that the axis of the rod 66 and drill D intersect at a predetermined distance "a" from the extreme tip of the drill, the drill point moves with a compound motion, with portions of the drill trailing from the lip C and located respectively adjacent the axis and periphery of the drill tip ("a" and "b" in Fig. 22) moving in paths which together generate a geometric frustrum of a cone, as indicated by the dotted lines in Fig. 22. Thus, the drill tip is rocked during upward pivotal movement of the quadrant, the result of this action being to grind a clearance angle which curves backwardly of the lip C. Also, by this compound motion, the clearance angle near the point of the drill will be ground steeper than the clearance angle farther out on the lip, that is, toward the periphery of the drill.

It has been explained above that the clearance at any given point in the cutting lip is determined by, and bears a constant relation to, the tangent, at that particular point, of its own individual axis. Therefore, near the point of the drill where the helices are of smaller diameter (their pitch remaining the same), these tangents form more acute angles with the axis of the drill than where the diameters are large, as near the outer corner of the lip. The clearance being governed by these angles must likewise be steeper near the point of the drill than it is farther out on the lip. In order to grade the clearance properly along the drill lip from point to periphery as above outlined, and curve the back side of the cutting edge so that the maximum strength and endurance, consistent with free cutting, are preserved at all points, it is necessary that every portion of the cutting lip should, while being ground, rock against the grinding wheel in a path very similar to that in which it travels when at work. It will therefore be seen that the present, improved drill grinder unit meets all the requirements necessary to grind the drill with the proper clearance angle varying in angularity from the point of the drill toward the periphery thereof.

Following the grinding of one lip and clearance angle of the drill, the latter is reversed in the holder 80 so that the drill is turned 180 degrees to present its other lip against the grinding face F. Such reversing of the drill is conveniently and accurately accomplished by simply sliding the clamp 95 laterally from the holder 80, turning the clamp through 180 degrees and reinserting the same in the opening 90 of the holder. Fig. 9, showing the clamp in one position and Fig. 15 illustrating the same in reversed position in the holder. Since the drill D remains fixed in the clamp 95, it will be seen that the drill is accurately positioned for the second grinding.

The grinding device has been described above as incorporated in the grinding machine, the bearing 39 being formed integrally with the wheel guard 30. It is also within the present concept to mount the drill holder device upon existing drill grinders as an attachment therefor. Referring to Figs. 29 to 31, the device is supported by the wheel guard 150 of a grinding machine 151 having a grinding wheel 152. A mounting bracket 153 is employed as the mounting means, the bracket having a pad 154 provided with slots 155 through which bolts 156 extend to be screwed into holes in the guard 150. The bracket 153 has a laterally extending hollow shaft portion 157 provided with a threaded hole 158 in its outer end. The shaft 157 corresponds to the shaft 40 and serves to mount the support member 60, with the adjusting screw 50 screwed into the threaded hole in the shaft.

It will be observed from the foregoing that the present invention provides a highly practical and efficient drill grinding device which functions to support and guide a drill to be ground in a manner such that the drill is ground with great precision and in accordance with standards generally accepted in the tool industry as providing a drill point capable of accurately drilling a hole and having maximum endurance and strength at all points along the drill lips. According to the invention, this highly desirable result is attained by first positioning the drill with a lip thereof against the rotating grinding wheel and then simultaneously rotating the drill tip and rocking the same to cause the wheel to grind the clearance at a steeper angle near the point of the drill than toward the periphery thereof. In the instant drill grinder unit, the rocking action is brought about by arranging the drill for rotation about an axis extending at an acute angle to the grinding face and locating the drill at an angle which bisects the axis of rotation at a predetermined distance from the grinding face of the grinding wheel, said distance determining the degree of rocking motion and thereby the angularity of the clearance rearwardly of the drill lip.

Having described only a typical preferred form and application of my invention, I do not wish to be limited or restricted to the specific details herein set forth, but wish to reserve to myself any variations or modifications that may appear to those skilled in the art and fall within the scope of the following claims.

Having described my invention, I claim:

1. A drill grinder device for use in connection with a grinding machine having a rotary grinding wheel provided with a flat grinding face, comprising: a support member carried by the machine and having a pivot axis extending at an acute angle to said grinding face; a quadrant pivotally mounted on said pivot axis; a holder means carried by said quadrant for support a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft.

2. A drill grinder device for use in connection with a grinding machine having a rotary grinding wheel provided with a flat grinding face, comprising: a support member carried by the machine and having a pivot axis extending at an acute angle to said grinding face; a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shafts, a screw rotatable on the carrier and screwed into an axial threaded hole in said shaft, locking means on said carrier engageable against said shaft and operative to lock the carrier in its positions of axial and rotative adjustment on said shaft, said support member is pivoted to said carrier and has an arcuate scale concentric with its pivotal axis, the device also including a pointer fixed relative to the said carrier and registrable with the graduations of said scale, and locking screw means for locking said support member in its different positions of angular adjustment on said carrier.

3. A drill grinding device for use in connection with a grinding machine having a rotary grinding wheel provided with a flat grinding face, comprising: a support member carried by the machine and having a pivot axis extending at an acute angle to said grinding face; a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said pivot axis consists of a pivot rod carried by said support member, and in which said quadrant is fixed to said pivot rod and has a generally channel-shaped portion providing an arcuate guideway, said portion having an elongate, arcuate slot, said quadrant having a protractor scale extending along its arcuate portion, said holder means having an arcuate foot adjustably slidable in said channel portion and registrable with the graduations of said protractor scale, the device including a binder screw carried by the quadrant and extending through said arcuate slot, and a wing nut on said screw for binding against said quadrant to retain said holder means in its positions of adjustment on said quadrant.

4. A drill grinder device for use in connection with a grinding machine having a rotary grinding wheel provided with a flat grinding face, comprising: a support member carried by the machine and having a pivot axis extending at an acute angle to said grinding face; a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove.

5. A drill grinder device for use in connection with a grinding machine having a rotary grinding wheel provided with a flat grinding face, comprising: a support member carried by the machine and having a pivot axis extending at an acute angle to said grinding face; a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove, a clamp element having a longitudinal slot, one portion of which is of V-groove form in which a drill is placeable, said clamp member being slidable into said socket of said holder member with its V-groove portion in alignment with said V-groove of said holder member.

6. A drill grinder device for use in connection with a grinding machine having a rotary grinding wheel provided with a flat grinding face, comprising: a support member carried by the machine and having a pivot axis extending at an acute angle to said grinding face; a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove, a clamp element having a longitudinal slot, one portion of which is of V-groove form in which a drill is placeable, said clamp member being slidable into said socket of said holder member with its V-groove portion in alignment with said V-groove of said holder member, said clamp element being shaped and dimensioned to adapt it for insertion into said socket in positions with its V-grove portion either aligned with said V-grooves of said holder member or with its V-grove portion facing in a direction opposite to that of said V-grooves so as to locate either of the lips of the drill in grinding position against said grinding face.

7. A drill grinder device for use in connection with a grinding machine having a rotary grinding wheel provided with a flat grinding face, comprising: a support member carried by the machine and having a pivot axis extending an acute angle to said grinding face, a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove, a clamp element having a longitudinal slot, one portion of which is of V-groove form in which a drill is placeable, said clamp member being slidable into said socket of said holder member with its V-groove portion in alignment with said V-groove of said holder member, said clamp element being shaped and dimensioned to adapt it for insertion into said socket in positions with its V-groove portion either aligned with said V-grooves of said holder member or with its V-groove portion facing in a direction opposite to that of said V-grooves so as to locate either of the lips of the drill in grinding position against said grinding face, a clamping member movable on said clamp element and operative to clamp the drill in said V-groove portion with the cutting end of the drill projecting from said clamp element in a direction toward said grinding face, said clamping member permitting axial adjustment of the drill in said clamp element to project the point of the drill selected distances beyond the intersection of the pivotal axis of said quadrant and the axis of the drill.

8. A drill grinder device for use in connection with a grinding machine having a rotary grinding wheel provided with a flat grinding face comprising: a support member carried by the machine and having a pivot axis extending at an acute angle to said grinding face, a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove, a clamp element having a longitudinal slot, one portion of which is of V-groove form in which a drill is placeable, said clamp member being slidable into said socket of said holder member with its V-groove portion in alignment with said V-groove of said holder member, said clamp element being shaped and dimensioned to adapt it from insertion into said socket in positions with its V-groove portion either aligned with said V-grooves of said holder member or with its V-groove portion facing in a direction opposite to that of said V-grooves so as to locate either of the lips of the drill in grinding position against said grinding face, a clamping member movable on said clamp element and operative to clamp the drill in said V-groove portion with the cutting end of the drill projecting from said clamp elements in a direction toward said grinding face, said clamping member permitting axial adjustment of the drill in said clamp element to project the point of the drill selected distances beyond the intersection of the pivotal axis of said quadrant and the axis of the drill, means for accurately positioning the drill axially in said clamp element, said means consisting of a gauge into which the clamp element and drill is insertable, with the drill loose in the element, said gauge having a plate at one end against which the pointed end of the drill is engageable, the gauge having a linear scale registrable with said clamp element so that axial projection of the drill beyond an end of the clamp element is readily ascertained.

9. A drill grinder device for use in connection with a grinding machine having a rotary grinding wheel provided with a flat grinding face, comprising: a support member carried by the machine and having a pivot axis extending at an acute angle to said grinding face, a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove, a clamp element having a longitudinal slot, one portion of which is of V-groove form in which a drill is placeable, said clamp member being slidable into said socket of said holder member with its V-groove portion in alignment with said V-groove of said holder member, said clamp element being shaped and dimensioned to adapt it for insertion into said socket in positions with its V-groove portion either aligned with said V-grooves of said holder member or with its V-groove portion facing in a direction opposite to that of said V-grooves so as to locate either of the lips of the drill in grinding position against said grinding face, a clamping member movable on said clamp element and operative to clamp the drill in said V-groove portion with the cutting end of the drill projecting from said clamp elements in a direction toward said grinding face, said clamping member permitting axial adjustment of the drill in said clamp element to project the point of the drill selected distances beyond the intersection of the pivotal axis of said quadrant and the axis of the drill, means for accurately positioning the drill axially in said clamp element, said means consisting of a gauge into which the clamp element and drill is insertable, with the drill loose in the element, said gauge having a plate at one end against which the pointed end of the drill is engageable, the gauge having a linear scale registrable with said clamp element so that axial projection of the drill beyond an end of the clamp element is readily ascertained, said gauge includes a block having a V-groove in which the cutting end of the drill is seatable; and a gripper element having legs slidable in grooves in said block, said gripper element being engageable against the drill to retain the same in said V-groove of said block.

10. A drill grinder device for use in connection with a grinding machine having a rotary grinding wheel provided with a flat grinding face, comprising: a support member carried by the machine and having a pivot axis extending at an acute angle to said grinding face, a quadrant pivotally mounted on said pivot axis; a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove, a clamp element having a longitudinal slot, one portion of which is of V-groove form in which a drill is placeable, said clamp member being slidable into said socket of said holder member with its V-groove portion in alignment with said V-groove of said holder member, said clamp element being shaped and dimensioned to adapt it for insertion into said socket in positions with its V-groove portion either aligned with said V-grooves of said holder member or with its V-groove portion facing in a direction opposite to that of said V-grooves so as to locate either of the lips of the drill in grinding position against said grinding face, a clamping member movable on said clamp element and operative to clamp the drill in said V-groove portion with the cutting end of the drill projecting from said clamp elements in a direction toward said grinding face, said clamping member permitting axial adjustment of the drill in said clamp element to project the point of the drill selected distances beyond the intersection of the pivotal axis of said quadrant and the axis of the drill, means for accurately positioning the drill axially in said clamp element, said means consisting of a gauge into which the clamp element and drill is insertable, with the drill loose in the element, said gauge having a plate at one end against which the pointed end of the drill is engageable, the gauge having a linear scale registrable with said clamp element so that axial projection of the drill beyond an end of the clamp element is readily ascertained, said gauge includes a block having a V-groove in which the cutting end of the drill is seatable; and a gripper element having legs slidable in grooves in said block, said gripper element being engageable against the drill to retain the same in said V-groove of said block, said linear scale is carried by said block and in which said plate is transparent and has an index line with which the lips of the drill are adapted to be registered as the drill is manually rotated, said lips being viewable through said plate.

11. A drill grinder device for use in connection with a grinding machine having a rotary grinding wheel provided with a flat grinding face, comprising: a support member carried by the machine and having a pivot axis extending at an acute angle to said grinding face, a quadrant pivotally mounted on said pivot axis, a holder means carried by said quadrant for support; a drill to be ground with the axis of the drill bisecting said pivotal axis at a predetermined distance from said grinding face; and adjustable mounting means for mounting said device for movement in directions parallel to and normal to the grinding face of the grinding wheel, said mounting means including a fixed shaft on the grinding machine and extending parallel to the axis of the grinding wheel, a carrier slidable on said shaft, a screw rotatable on the carrier and screwed into an axial threaded hole in said shaft, locking means on said carrier engageable against said shaft and operative to lock the carrier in its positions of axial and rotative adjustment on said shaft, said holder means includes a holder member having an arcuate foot slidably adjustable on said quadrant and having a bar portion provided with a V-groove extending radially of said arcuate quadrant, said bar portion having a socket extending normal to said V-groove, a clamp element having a longitudinal slot, one portion of which is of V-groove form in which a drill is placeable, said clamp member being slidable into said socket of said holder member with its V-groove portion in alignment with said V-groove of said holder member, said clamp element being shaped and dimensioned to adapt it for insertion into said socket in positions with its V-groove portion either aligned with said V-grooves of said holder member or with its V-groove portion facing in a direction opposite to that of said V-grooves so as to locate either of the lips of the drill in grinding position against said grinding face, a clamping member movable on said clamp element and operative to clamp the drill in said V-groove portion with the cutting end of the drill projecting from said clamp elements in a direction toward said grinding face, said clamping member permitting axial adjustment of the drill in said clamp element to project the point of the drill selected distances beyond the intersection of the pivotal axis of said quadrant and the axis of the drill, means for accurately positioning the drill axially in said clamp element, said means consisting of a gauge into which the clamp element and drill is insertable, with the drill loose in the element, said gauge having a plate at one end against which the pointed end of the drill is engageable, the gauge having a linear scale registrable with said clamp element so that axial projection of the drill beyond an end of the clamp element is readily ascertained, said gauge includes a block having a V-groove in which the cutting end of the drill is seatable; and a gripper element having legs slidable in grooves in said block, said gripper element being engageable against the drill to retain the same in said V-groove of said block, said linear scale is carried by said block and in which said plate is transparent and has an index line with which the lips of the drill are adapted to be registered as the drill is manually rotated, said lips being viewable through said plate, said gauge also includes a guage plate slidable along said linear scale and engageable against said clamp element; and binder screw means on said guage plate operative to lock said gauge plate in selected positions on said scale.

References Cited in the file of this patent

UNITED STATES PATENTS

| | | |
|---|---|---|
| 1,678,413 | Zahringer | July 24, 1928 |
| 2,770,929 | Nadelin | Nov. 20, 1956 |